(No Model.)
L. F. WANKEY.
NUT LOCK.
No. 478,725. Patented July 12, 1892.
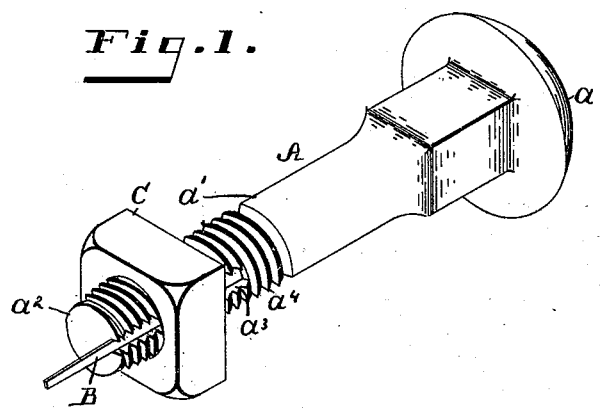
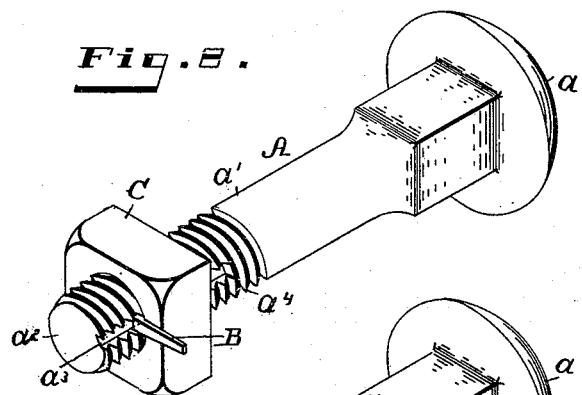
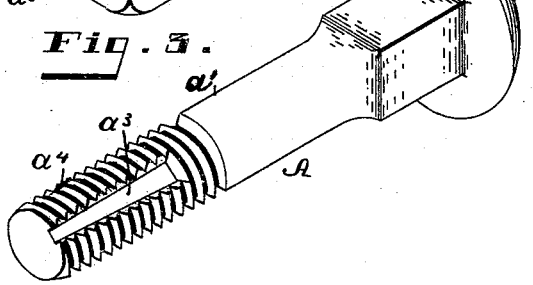
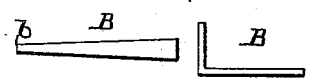
Witnesses:
Inventor
Lewis F. Wankey
By Rich. H. Manning, Atty

UNITED STATES PATENT OFFICE.

LEWIS F. WANKEY, OF KANSAS CITY, MISSOURI, ASSIGNOR OF ONE-HALF TO JAMES W. FAIRMAN, OF SAME PLACE.

NUT-LOCK.

SPECIFICATION forming part of Letters Patent No. 478,725, dated July 12, 1892.

Application filed April 5, 1890. Serial No. 346,742. (No model.)

*To all whom it may concern:*

Be it known that I, LEWIS F. WANKEY, a citizen of the United States, residing at Kansas City, in the county of Jackson and State of Missouri, have invented certain new and useful Improvements in Nut-Locks; and I do hereby declare that the following is a full, clear, and exact description of the same, such as will enable others to make and use the same, reference being had to the accompanying drawings forming a part of this specification.

The object of my invention is to prevent the accidental displacement of the nut from the shank of the bolt and also to enable the nut to be adjusted in opposite directions and secured at varying points of adjustment upon the shank and enable the resistance to compression upon the nut to be increased in degrees; and it further consists in the novel construction and combination of parts, which will first be fully described, and specifically pointed out in the claims.

In the drawings, Figure 1 is a view in perspective of a threaded bolt, showing my improved locking device thereon and the nut adjusted upon the shank. Fig. 2 is a view similar to that shown in Fig. 1, showing the locking device turned up against the end of the nut. Fig. 3 is a view in perspective of the bolt with the nut and its fastening removed, showing the recess for the tongue. Fig. 4 are views of the separable fastening devices detached from the bolt in a straight and also bent position.

Similar letters of reference indicate corresponding parts in all the figures.

Referring to the drawings, A represents an ordinary bolt with head $a$. $a'$ is the shank of the bolt, which is made with a screw-threaded portion $a^2$ at one end, a part of the distance in the direction of the other end provided with head $a$. In the shank $a'$ of the bolt A, through the threaded portion $a^2$, is made a longitudinal recess, the sides of which recess are deflected at an angle to each other in the direction of the inner end of said recess and the head of the bolt and which extends from the end portion of the shank in the direction of the head $a$ a short distance in the screw-threaded portion $a^2$ of said shank and in the line of diameter of said shank a short distance below the surface of the said threads $a^4$, the greatest width of which recess is in the direction of the head $a$ of the bolt and from which point toward the other end of the bolt the said recess is gradually contracted in width. In the recess $a^3$ of the shank $a'$ is placed below the surface of the threads $a^4$ a separable tongue B, the sides of which are deflected at an angle in the direction of its inner end and the head of the bolt and is made from a soft metal which retains its position when flexed in position. The tapering end portion $b$ of the tongue B extends in length a short distance beyond the end of the threaded portion $a^2$ and is nearly of the size of the said recess $a^3$, in which the tongue B readily fits in place. To the bolt A is fitted a nut C, which is adjusted to and in the direction of the head $a$.

In the operation of the fastening the nut is placed on the end of the shank and adjusted in the direction of the head $a$ as far as required, and the tapering end portion $b$ of the tongue B is then bent in an upright position against the end of the said nut and as the nut is further adjusted toward the head $a$ the portion of the tongue beneath the nut, which is of an increased width, is also forced against the end of the nut and resistance to the turning of the nut is increased in degrees. When it is desired to remove the nut from the shank, the tongue is forced down and within the recess of the shank, and as comparatively soft metal may be used for the tongue it may be readily made straight for further use. The position of the tongue in the recess in the shank is such as to escape contact with the threads of the nut. As soon as the nut is placed upon the shank of the bolt the tongue, otherwise separable, is self-retained within the recess of the shank.

In all uses of the bolt and nut the fastening to the nut may be equally applied and affords a secure retention after adjustment.

I am aware of the state of the art of record—namely, United States patents granted to J. Bell, October 4, 1870, No. 107,998; R. C. Smith, June 27, 1882, No. 260,249; and L. B. Lowman, December 21, 1886, No. 354,868—in nut-locks, all of which show a narrow key or tongue, uniform in width from one end to the other, and as the nut is turned toward the bolt-head and the compression upon the nut increased, so that the threads of the nut and shank are strained, no additional resistance is afforded to the nut at one place upon the shank than at another. In my tongue or key the resistance to back-pressure of the nut is increased in degrees as the nut is turned in the direction to move the nut toward the bolt-head, and in my construction of tongue I am enabled to retain the nut more securely when turned hard to clamp the object between the bolt-head and nut, especially upon cars, where the jolting weakens the efficiency of an ordinary nut.

Having fully described my invention, what I now claim as new, and desire to secure by Letters Patent, is—

1. In nut-locks, the combination, with a bolt having a suitable head and nut and a shank provided with a longitudinal recess and having the sides of said recess deflected at an angle to each other in the direction of the inner end of said recess and the bolt-head, of a tongue or key fitted within said recess, having its sides deflected at an angle to each other in the direction of the inner end of said recess and of the said bolt-head and adapted to resist compression upon the nut in degrees, substantially as described.

2. In nut-locks, a bolt having a suitable head and a shank provided with a threaded end portion and a longitudinal recess, and the sides of said recess deflected at an angle to each other in the direction of the inner end of said recess and the head of the bolt, a nut on said shank, and a separable tongue having its sides deflected at an angle to each other in the direction of the inner end of said recess in said shank and also having a flexible outer end, substantially as and for the purpose described.

LEWIS F. WANKEY.

Witnesses:
H. R. TOMLINSON,
S. L. C. HOSSON.